United States Patent Office 3,450,183
Patented June 17, 1969

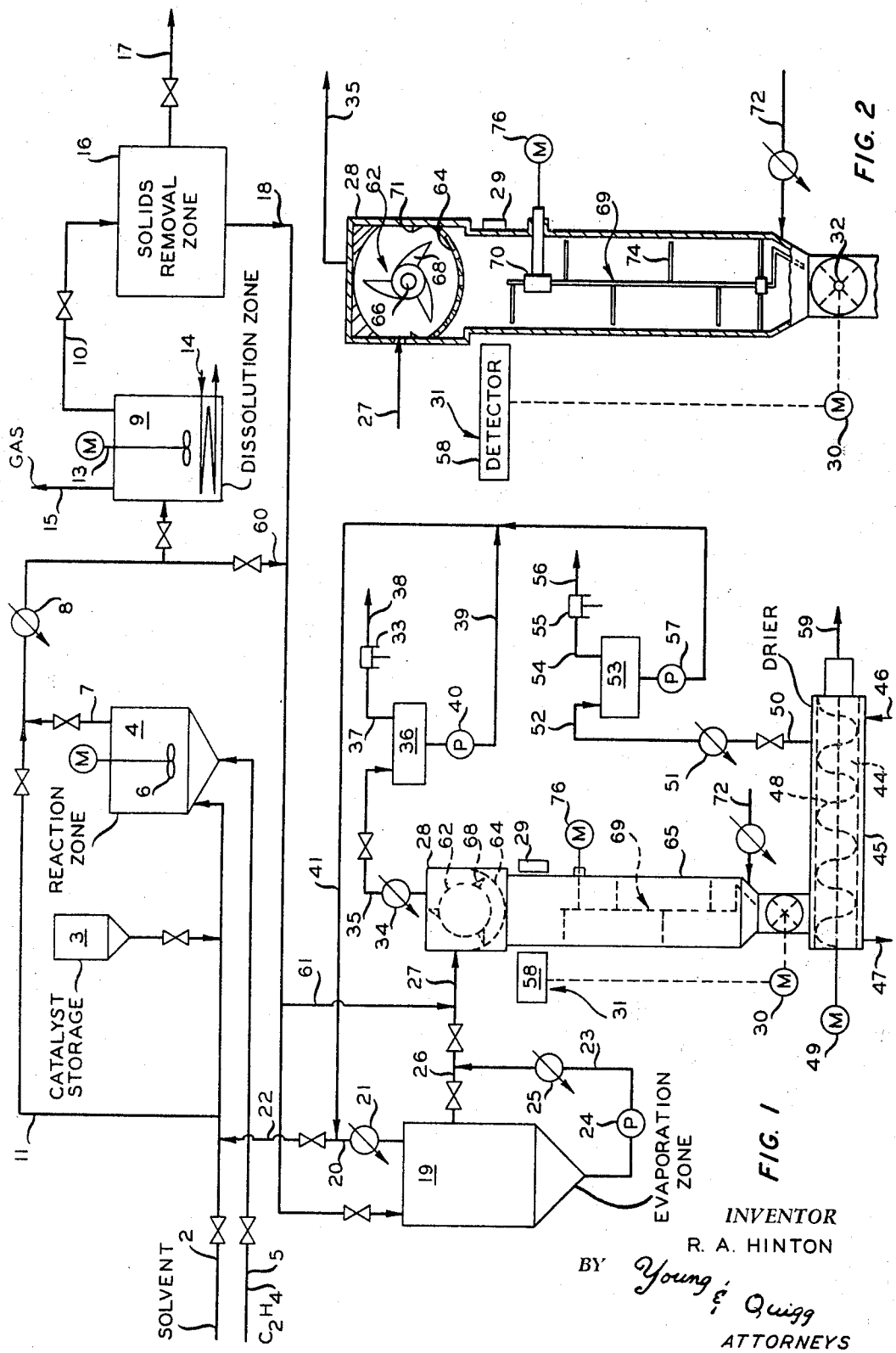

3,450,183
POLYMER RECOVERY APPARATUS
Robert A. Hinton, Bartlesville, Okla., assignor to Phillips Petroleum Company, a corporation of Delaware
Filed June 25, 1965, Ser. No. 467,022
Int. Cl. B01d 1/00
U.S. Cl. 159—2       1 Claim

ABSTRACT OF THE DISCLOSURE

Apparatus for the recovery of polyolefin solids from a solution containing same which comprises in combination means for flashing the polyolefin solution into the top of a vertical column where the precipitated polymer is chopped into fine particles, for permitting a sized solid particle to pass downwardly through a stirred purge zone countercurrent to an inert purge gas, and for regulating the amount of solid polymer removed from the vertical column.

---

This invention relates to the production and recovery of normally solid polymers. In one aspect, it relates to the recovery of a normally solid polymer from a solution thereof in a solvent. In another aspect, it relates to a novel method and apparatus for the production of a substantially solvent-free polymer.

Several different processes are known in the art for the production of normally solid polymers, such as polyethylene, polybutadiene and polystyrene. In many of the known processes, the polymer is initially obtained in the form of a solution in the solvent and must be recovered therefrom. Recovery can be effected by different methods, such as solvent vaporization, which leaves the polymer as a non-volatile residue, and cooling of the solution to cause precipitation of the polymer, which is subsequently recovered by filtration. Vaporization processes for solvent removal are accompanied by difficulty in removing the last traces of solvent from the polymer. This difficulty arises from the fact that as the solution becomes more and more concentrated, its viscosity increases. Heat transfer is correspondingly retarded and, if proper control is not exercised, the polymer may be thermally decomposed as a result of unduly high residence times in recovery equipment at high localized temperatures. It is highly desirable to free the polymer from the solvent insofar as possible because small amounts, e.g. a few weight percent, of solvent in the polymer form bubbles, and consequently cavities, when the polymer is heated preparatory to molding.

The present invention provides a process and apparatus by which polymer can be recovered from a solution thereof by vaporization of the solvent without thermal decomposition of the polymer and the finally recovered polymer contains less than 1 weight percent of solvent, often less than 0.2 weight percent, and can be molded without undue formation of cavities caused by solvent vaporization.

The process of the present invention is effected as follows. In a first stage a solution of polymer is flashed in a vaporization zone maintained below the melting point of the polymer so as to remove the solvent and obtain a solid concentrate. The flash zone has disposed therein a chopping means wherein the solid concentrate is reduced to a predetermined size. In a second stage, the chopped solid concentrate from the first stage is subjected to a mixing action countercurrent to a stream of inert purge gas at a temperature below the melting point of the polymer and a substantial portion of the remaining solvent is vaporized. The polymer then freed of solvent is recovered as product.

The melting point of the polymer will vary, depending on the physical and chemical nature and origin of the polymer. Polyethylenes ordinarily range in melting point from about 210 to about 260° F. The polyethylenes prepared by the process of Hogan and Banks, U.S. Patent 2,825,721, ordinarily have melting points in the range of 240 to 260° F. but can have melting points outside this range.

A special feature of this invention resides in conducting the flashing of the concentrated polymer solution, in the first step, at a temperature below the melting point of the polymer, and preferably at a subatmospheric pressure. Thus, an apparently "dry" or solid flash residue is obtained which is readily removed from the flashing apparatus. It is also within the scope of this invention to form and collect the sized residue in the "dry" state and melt the collected residue for transfer, as a liquid, to a subsequent step in the process.

The recovery process of this invention is particularly applicable to the recovery of a polymer produced in a process of the type disclosed and claimed in the aforementioned Hogan and Banks patent, wherein an aliphatic 1-olefin having a maximum chain length of 8 carbon atoms and no branching nearer the double bond than the 4-position is subjected to polymerization conditions in the presence of a catalyst comprising chromium oxide, of which a substantial portion of the chromium is hexavalent, associated with at least one oxide selected from the group consisting of silica, alumina, zirconia and thoria. The chromium (Cr) content of the catalyst is ordinarily a minor proportion, preferably from 0.1 to 10 weight percent. Polymerization is ordinarily conducted at a temperature in the range of 150 to 450° F. The reacted olefin, e.g. ethylene and/or propylene, is often, though not necessarily, subjected to the polymerization conditions in admixture with a hydrocarbon solvent which is inert and can exist as a liquid at the polymerization temperature. Suitable solvents of this class are normally liquid naphthenes, such as cyclopentane, cyclohexane, methylcyclopentane, methylcyclohexane and paraffinic hydrocarbons having from 3 to 12, preferably 5 to 12, carbon atoms per molecule, e.g. normal hexane, isoheptanes, normal octane and 2,2,4-trimethylpentane. The reaction can be conducted as a fixed-bed reaction but is, in many cases, conducted with the catalyst in comminuted form in suspension, as a slurry, in the hydrocarbon solvent. The effluent withdrawn from the reactor comprises a solution of polymer in the solvent, and when a slurry or suspended catalyst is used, the effluent comprises a solution of the polymer in the solvent, suspended catalyst with undissolved polymer adhering thereto, and in many cases, small amounts of unreacted olefin. The unreacted olefin can be removed by venting and/or flashing and the remaining mixture is ordinarily heated to a suitable temperature to effect substantially complete solution of the polymer in the solvent. Additional solvent can be added at this point, if desired, and it is ordinarily the practice to adjust the concentration of polymer in the solution to a value in the range of approximately 2 to approximately 10 weight percent. The solution can be then filtered to remove the suspended catalyst and a solution containing from 2 to 10 weight percent of polymer in the solvent is obtained from which the polymer is recovered. The method of this invention is particularly applicable to the recovery of polymer from such a solution, and particularly to such a solution of a polyethylene. Polymers so recovered are useful for fabrication into pipe, tubing, electrical insulation and water-resistant wrappings, as more fully set forth in the cited patent.

According to one modification of this invention, approximately 25 to 75 percent of the solvent is vaporized in a preliminary evaporization zone, from about 85 to 99 percent of the remaining solvent is vaporized in the first stage, and most or all of the remaining solvent is vaporized in the final stage.

When the invention is applied to a solution of polyethylene in, for example, 2,2,4-trimethylpentane or cyclohexane, as previously indicated, it is preferred that the solution fed to the first stage of the process have a polyethylene concentration in the range 8 to 15 weight percent. The first stage concentration effects a further concentration to from 50 to 99 percent, and the final stage decreases the solvent concentration to less than 1 weight percent in the product polymer.

In one embodiment of the invention, a preliminary evaporation is conducted at temperatures in the range 250 to 350° F. and above the melting point of the polymer and the normal boiling point of the solvent, and a pressure in the raneg of 0 to 100 p.s.i.g.; the first step is a vacuum flash conducted at a temperature in the range 100 to 250° F. and below the melting point of the polyethylene, at a pressure which is preferably not greater than 10 p.s.i.a. but which can be as high as about 13 p.s.i.a.; the final step is a vacuum extrusion step conducted at a maximum pressure of about 10 p.si.a. and a temperature in the range 375 to 450° F. In the final step, the molten polyethylene is subjected to mixing or kneading and any remaining solvent is vaporized under vacuum. The molten polymer is then extruded in the form of a continuous column or filament and can be cut into pellets, cylinders or other desired shape and any desired length.

In another embodiment of the invention wherein a high-solids reactor is employed to produce the polymer, the preliminary evaporation step and solids removal step are omitted as the polymer solution at a pressure of 200 to 450 p.s.i.g. and a temperature of 290 to 350° F. is fed directly into a flash zone provided with the chopper and maintained at a pressure of 0 to 5 p.s.i.g. and a temperature in the range of 180 to 210° F. below the melting point of the polymer.

The process of this invention can be conducted in evaporators or vacuum flash tanks, the general construction of which is well known in the art. However, certain special features are involved in the construction of the flash apparatus. It has been found that it is difficult to handle concentrated polyethylene due to low bulk density of the polymer formed after flashing. This condition can be remedied by one aspect of this invention which provides novel mechanical means for severing the extruded strings or filaments. The apparatus for this purpose is subsequently described herein.

The apparatus used in the final step is ordinarily in the form of a heated elongated chamber having apparatus connected therewith which can reduce the pressure therein to subatmospheric. This apparatus is provided with an agitation or kneading device, such as one or more screw conveyors, and is further equipped with one or more outlet conduits in the form of a constricted opening or die through which the molten polymer can be extruded. A suitable device for the final stage solvent removal is manufactured by Welding Engineers, Inc., of Norristown, Pa., and is described in bulletins currently published by that firm. Such an apparatus is capable of operating at a pressure as low as 6 millimeters of mercury, absolute.

The solvent vaporized in the steps according to this invention can be condensed, combined and recovered, for example, for recycling to the polymerization reaction.

Other objects, advantages and features of the invention will be aparent to those skilled in the art from the following description, the drawings and the appended claims.

In the drawings:

FIGURE 1 is a diagrammatic illustration of the invention.

FIGURE 2 is a diagrammatic illustration of the solid polymer recovery zone of FIGURE 1.

Referring now to FIGURE 1 of the drawing, solvent enters through inlet 2 and is mixed with catalyst supplied from storage zone 3. The catalyst can be, for example, chromium oxide supported on a silica-alumina gel and prepared as described subsequently herein. The catalyst particle size is sufficiently small to facilitate the formation of a slurry or catalyst in the solvent. A suitable range of particle size is from 20 to 100 mesh. The catalyst-solvent slurry passes into reaction zone 4. Ethylene enters the system through inlet 5 and passes into the reaction zone 4 wherein it is mixed with the catalyst and the solvent at a temperature, for example, of approximately 275° F. The solvent can be cyclohexane. The proportions of solvent and ethylene are so adjusted that the concentration of polymer in the reaction mixture does not exceed approximately 15 percent and preferably is in the range from 5 to 10 weight percent. However, when a high-solids reactor is employed as described hereafter, the polymer concentration is generally about 40 weight percent. The pressure in the reaction zone 4 is sufficient to maintain the solvent substantially in the liquid phase and can be, for example, 500 p.s.i. The reaction mixture is maintained in a state of turbulence so that the catalyst is maintained in a substantially uniform suspension or slurry in the reaction mixture. This turbulence can be obtained by jet action of incoming ethylene through inlet 5 and/or by the use of a mechanical stirrer indicated by the numeral 6 and driven by a suitable motor M. The reaction zone effluent which comprises a mixture of polymer, solvent and suspended catalyst, together with small amounts of unreacted and/or inert gas, is passed through conduit 7 and heater 8 to dissolution zone 9. Additional solvent can be added through conduit 11, if desired, in order to adjust the concentration to a suitably low value, previously stated, so that the viscosity is not too high for efficient agitation. In dissolution zone 9, the mixture is maintained in a state of turbulence as, for example, by means of a mechanical stirrer 13 driven by a motor M' and the temperature is maintained, for example by the use of heater 14, at from 300 to 325° F., i.e., somewhat higher than that utilized in reaction zone 4. The pressure is sufficient to maintain the solvent substantially in the liquid phase but is preferably lower than that in reaction zone 4 to facilitate the evolution of dissolved gas, including unreacted ethylene, which is vented through outlet 15. Heater 14 is of any suitable design known in the art; for example, it can be a steam coil or an electric immersion heater. Effluent from dissolution zone 9 passes through conduit 10 to solids removal zone 16. The material passed through conduit 10 is a homogeneous solution of substantially all of the polymer in the solvent, which solution contains suspended solid catalyst. Solids removal zone 16 comprises any suitable equipment or combination thereof known in the art for the removal of suspended solids from liquids. For example, it can be a filter or a centrifuge. It should be suitable for operation under pressure in order to maintain the solvent in the liquid phase during the filtration. Catalyst removed by the filtration is withdrawn from the system through conduit 17. The withdrawn catalyst can be regenerated or reactivated, if desired, and recycled to catalyst storage zone 3 by means not shown in the drawing. The solution which has been freed of suspended solids is passed through conduit 18 to preliminary evaporation zone 19 which is ordinarily in the form of a flash evaporation tank and is operated, for example, at a temperature of 290° F. and a pressure of 33 p.s.i.g. Approximately half of the solvent is evaporated in zone 19, and the evaporated solvent is passed through conduit 20 and condenser 21. The condensed solvent is then returned through conduits 22 and 2. The concentrated residue from evaporation zone 19 is passed through conduit 23, pump 24 and heat exchanger 25 wherein the temperature is raised, for example to 310° F. Part of the solution is returned through conduit 26 to evaporation zone 19. This mode of operation allows outside heating of the unvaporized material from evaporation zone 19 and is a preferred method of supplying heat to said zone, since it is ordinarily impractical to supply heat efficiently directly to the interior of zone 19 on account of the physical characteristics of the polymer-solvent solution.

The remainder of the unvaporized material is passed through conduit 27 to vacuum flash zone 28, which is operated for example at a temperature of 180° to 210° F. and 0 to 5 p.s.i.a. The solution entering vacuum flash-comminution zone 28 has a concentration for example of 10 to 30 weight percent polyethylene in the cyclohexane solution. The partially concentrated polymer solution enters flash zone 28. A vacuum is maintained on flash zone 28 by means of vacuum pump 33, which is connected to zone 28 through condenser 34, conduit 35, accumulator 36, and conduit 37. Solvent which is vaporized in vacuum flash zone 28 is condensed in condenser 34 and passed through conduit 35 to accumulator 36. Gaseous material is withdrawn from the system through exhaust conduit 38. Condensed solvent is passed through conduit 39 by means of pump 40 and then passes through conduits 41 and 22 for return to conduit 2.

Vacuum flash zone 28 has therein a knife-carrying member 62 with three or more arms, each of which carries a knife blade. Screen 64 is provided of appropriate size to retain the solid polymer in zone 28 until the desired polymer particle size as determined by the size of the screen 64 is obtained by means of the chopper 62.

The sized solid polymer particles having fallen through screen 64 are collected in purge zone 65. Inert gas such as nitrogen is introduced through line 72 into the zone 65 so as to further assist in removing solvent remaining in the polymer particles. The level within zone 65 is controlled by level controller 58 which is operatively connected to motor 30 and star valve 31 and thereby regulates the rate of removal zone 65.

The material from purge zone 65 in communication with vacuum extruder-dryer 43 passes the same. This vacuum extruder-dryer comprises an inner chamber 44 enclosed within a heating jacket 45 through which hot oil is circulated, being supplied through inlet 46 and withdrawn through outlet 47 to heating and recirculation means, not shown. Within chamber 44 is positioned one or more helical conveyors or extruders 48 mounted on a shaft which is connected with a suitable driving motor, as shown in the drawing. Also connected with the inner chamber 44 of the vacuum extruder-dryer through conduit 50, condenser 51, conduit 52, accumulator 53 and conduit 54 is vacuum pump 55 which exhausts through conduit 56.

Polymer at a temperature below its melting point is withdrawn at a rate regulated by level controller 32 and star valve 31 from purge zone 65 to vacuum extruder-dryer 43 and is therein kneaded at a temperature above its melting point, under a vacuum produced by vacuum pump 55, so that substantially the last trace of solvent is removed therefrom. Solvent vaporized in vacuum extruder-dryer 43 is passed through conduit 50, condensed in condenser 51 and passed into accumulator 53. Liquefied solvent is then withdrawn and returned through conduit 41 and pump 57 through conduit 22 to inlet 2.

Molten polymer is extruded as one or more strands or filaments from vacuum extruder-dryer 45 along or through conduit or route 59 and subsequently recovered in a conventional manner.

In another embodiment of this invention, as further shown in FIGURE 1, when a high-solids reactor such as that described in copending application Ser. No. 208,047, filed July 6, 1962, is employed the polymer concentration in the cyclohexane solvent is about 40 weight percent. Thus the dissolution zone 9, solids removal zone 16 and preliminary evaporation zone are omitted from the flow path and the reactor effluent is introduced by means of conduits 60, 18 and 61 directly to the flash zone 28 and flashed therein. The solid polymer is thereafter treated as previously described.

As shown in FIGURE 2, a polymer pelletizing unit is provided wherein conduit 27 is provided to introduce the polymer solution into the flash zone 28. Conduit 35 is provided to remove the solvent flashed from the chopping-flash zone. The polymer precipitated is reduced in size by the chopper 62. The wall of the apparatus supports approximately at its center a horizontal shaft 66 which revolves in suitable bearings and supports in its inner part a knife-carrying member which is virtually integral with it. This member has three or more arms 68, each of which carries a knife secured thereon. The knife-carrying member has discs on both sides to prevent particles of the material being disintegrated from penetrating to the bearings of the machine. On a prolongation of the shaft 66 is mounted a flywheel which serves at the same time as a driving pulley.

Around the knife-carrying member are arranged a certain number of fixed knives 71, mounted on the body of the apparatus. The distribution of the fixed knives is such that in no case is a cut effected between more than one fixed knife and one rotating knife at the same time, the efficiency or output of the machine being thereby increased and the motive power required being reduced.

The comminuted material passes through a semicylindrical perforated screen 64 in a downward direction after being reduced by chopper 62 to a size capable of passing therethrough. The particle-sized polymer is collected in purge zone 65 which is in communication at the lower end thereof with an evaporator-dryer such as shown in FIGURE 1. Conduit 72 is provided to introduce purge gas into the lower portion of the purge zone 65.

The level in zone 65 is regulated by means of a level detector such as the radiation type level detector 31 which controls the on-off action of star valve 32 by passing a signal to motor 30, which in turn actuates the valve member. The illustrated level controller has a radiation source 29 and a detector means such as an ohmart detector 58 which, due to changes in radiation transmission across the column due to the polymer level within zone 65, provides a signal to actuate the power source 30 for star valve 32. In order to further assist the purging of the particulate solids in zone 65, agitator 69 with drive assembly 76 is provided. The agitating means can be of any design and, as illustrated, comprises a shaft 69 supported by mount 70 having a plurality of arms 74 thereon.

The following examples are presented to more fully describe the invention, but it is not intended that they should be construed as limiting the invention thereto.

*Example I*

In a run for the production of polyethylene, a saturated solution of ethylene in cyclohexane is maintained in a pressure reactor equipped with a stirrer. The cyclohexane containing 20 to 100 mesh catalyst in suspension is supplied continuously to the reactor. Ethylene from which oxygen has been removed by contact with reduced copper oxide is supplied to the reactor as a separate stream. The catalyst is prepared by impregnating a steam-aged, coprecipitated gel composite comprising 90 weight percent silica and 10 weight percent alumina with an aqueous solution of chromium trioxide, drying the resulting solid composite, and heating the dried composite at approximately 950° F. for about 5 hours in a stream of substantially anhydrous air. The catalyst contains a total of 2 weight percent chromium, at least half of which is in the hexavalent state.

The reactor is maintained at a temperature of approximately 300° F. and a pressure of approximately 600 p.s.i.g. Total effluent is continuously withdrawn from the reactor, heated to 315° F. and passed to a dissolution tank maintained at 315° F. and 100 p.s.i. from which unreacted ethylene and any other normally gaseous material is vented. Additional solvent is added to the total reactor effluent prior to the heating and flashing. The proportion of ethylene to total cyclohexane added upstream and downstream from the reactor is so adjusted that a solution containing approximately 5 weight percent of polyethylene in cyclohexane is obtained. After heating the effluent to approximately 315° F. and agitating to effect complete solution of the polymer in the solvent, as described, the catalyst is removed by filtration at approximately 315° F. and 100 p.s.i. The resulting 5 percent solution of polyethylene is passed to a solvent evaporator maintained at 290° F. and 33 p.s.i.g. wherein approximately half of the solvent is evaporated. The unvaporized material is withdrawn from the body of the vaporator and passed through a heater wherein it is heated to approximately 310° F. Approximately half of the heated material is returned to the evaporator to supply heat thereto. The remainder is passed to a vacuum flash tank maintained at 200° F. and 3 p.s.i.a. The entering solution, which contains about 10 weight percent polyethylene, is passed to a flash chopping zone which comminutes the material emerging from the flashed solution. The solid is then passed through a sizing screen to a purge zone. After purging with nitrogen the solid particles are passed to a vacuum extruder-dryer Model 2052B (Model 2052B Extra Long is also satisfactory), manufactured by Welding Engineers, Inc., and containing a double helical agitator. In the vacuum extruder-dryer the temperature is maintained between 370 and 450° F. by circulating hot oil through the heating jacket. The pressure within the middle chamber of the extruder-dryer is maintained at approximately 30 to 50 mm. Hg. Molten polymer containing from 0.019 to 0.026 weight percent of solvent is extruded from the vacuum extruder-dryer and passed through an open tank containing water which cools and solidifies the polymer. The solidified polymer emerges from the cooling tank and is cut by means of a rotary cutter into cylindrical pellets which are recovered as the product of the process.

*Example II*

Ethylene is fed into the reactor at the rate of about 76,749 pounds per day at a temperature of about 230° F. Activated catalyst consisting essentially of chromium oxide (a portion hexavalent) deposited on silica-alumina (chromium oxide concentration about 2 weight percent) in finely divided form, 50 weight percent being less than 10 microns in size, is admixed with cyclohexane (as the solvent feed) and the resulting catalyst slurry is fed to the reactor at the rate of 14.4 pounds of catalyst and 160,000 pounds of cyclohexane per day. By means of circulating the cooling water through the jacket of the reactor, the temperature is maintained at about 260° F. and the reactor pressure is controlled at about 450 p.s.i.a.

The effluent solution of polymer, containing about 32 weight percent polymer, is fed directly to the chopper zone which also serves as vacuum flash zone. The entering solution contains about 32 weight percent polyethylene. The material which emerges from the flashed solution and which is solid is passed to a chopper and through a sizing screen to a purge zone. After purging with nitrogen the solid particles are passed to a vacuum extruder-dryer Model 2052B (Model 2052B Extra Long is also satisfactory), manufactured by Welding Engineers, Inc., and containing a double helical agitator. In the vacuum extruder-dryer the temperature is maintained between 370 and 450° F. by circulating hot oil through the heating jacket. The pressure within the middle chamber of the extruder-dryer is maintained at approximately 30 to 50 mm Hg. Molten polymer containing from 0.019 to 0.026 weight percent of solvent is extruded from the vacuum extruder-dryer and passed through an open tank containing water which cools and solidifies the polymer. The solidified polymer emerges from the cooling tank and is cut by means of a rotary cutter into cylindrical pellets which are recovered as the product of the process.

Although the process of this invention has been described in connection with particular polyethylene processes, it is clearly not limited thereto but is also applicable to the recovery of any normally solid thermoplastic polymer from a solution thereof in a solvent. Thus, the process is also applicable to solutions of polybutadienes, especially hydrogenated polybutadienes as described in U.S. Patent No. 2,864,809 by Jones and Moberly, polystyrenes, polypropylenes, polyisobutylenes, and polyethylenes produced by processes other than that of the type described herein, as well as to the recovery of halogenated polyethylenes. Also, the process is not limited to the recovery of polymers from saturated hydrocarbon solvents but is applicable wherein solvents such as chloroform, carbon tetrachloride, carbon disulfide and aromatic hydrocarbons and derivatives thereof are used as solvents. The essence of this invention is that a normally solid thermoplastic polymer can be recovered substantially free from solvent by a process which comprises evaporating a substantial portion of the solvent at a temperature below the melting point of the polymer while simultaneously chopping or comminuting same, agitating the polymer at a temperature above its melting point to vaporize the remaining solvent, and recovering a substantially solvent-free polymer.

Reasonable variations and modifications of this invention can be made, or followed in view of the foregoing, without departing from the spirit or scope thereof.

I claim:
1. An evaporating apparatus for recovering a normally solid thermoplastic polymer material from a solution thereof which comprises in combination a vertically disposed elongated cylindrical chamber having disposed therein a screen member dividing said chamber into an upper and lower zone, said upper zone being enclosed thereby forming a flash zone, said lower zone being so adapted at the end thereof for removal of solids therefrom, first conduit means to introduce a solution of normally solid material to said upper zone, second conduit means to remove vaporized solvent and purge gas from said upper zone, third conduit means to introduce a purge gas into said lower zone, chopping means disposed in said upper zone and in association with said screen member which is so adapted that solids are retained in contact with said chopping means until the solids have been sized through same, level control means in said lower zone, valve means responsive to said level control means to regulate the removal of solids from said lower zone, agitator means disposed within said lower zone and drive assembly means in operable association with said agitator means.

References Cited

UNITED STATES PATENTS

| | | | |
|---|---|---|---|
| 2,953,557 | 9/1960 | Wride et al. | 260—94.9 |
| 3,072,626 | 1/1963 | Cines | 260—96 |
| 3,244,688 | 4/1966 | Goins | 260—94.9 |
| 3,036,057 | 5/1962 | Wallace | 260—94.9 |
| 3,248,455 | 4/1966 | Harsch et al. | 260—879 |

FOREIGN PATENTS 479,639   2/1938   Great Britain.

JOSEPH L. SCHOFER, *Primary Examiner.*

WILLIAM F. HAMROCK, *Assistant Examiner.*

U.S. Cl. X.R.

23—284; 159—25, 44; 210—173, 174; 260—93.5, 93.7, 94.7, 94.9, 94.8, 96